United States Patent
Gomi et al.

(10) Patent No.: US 8,220,571 B2
(45) Date of Patent: Jul. 17, 2012

(54) FRICTIONAL DRIVE DEVICE AND INVERTED PENDULUM TYPE VEHICLE USING THE SAME

(75) Inventors: Hiroshi Gomi, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 186 days.

(21) Appl. No.: 12/884,365

(22) Filed: Sep. 17, 2010

(65) Prior Publication Data

US 2011/0067935 A1   Mar. 24, 2011

(30) Foreign Application Priority Data

Sep. 21, 2009 (JP) ................................ 2009-218246

(51) Int. Cl.
*B62D 61/00* (2006.01)
(52) U.S. Cl. ....................................................... 180/21
(58) Field of Classification Search ..................... 180/21, 180/7.1, 10
See application file for complete search history.

(56) References Cited

U.S. PATENT DOCUMENTS

| | | | | | |
|---|---|---|---|---|---|
| 2,590,174 | A | * | 3/1952 | Hait | 180/21 |
| 2,595,476 | A | * | 5/1952 | Morkoski | 180/21 |
| 2,603,301 | A | * | 7/1952 | Sipior et al. | 180/7.1 |
| 2,687,048 | A | * | 8/1954 | Butler | 74/655 |
| 4,715,460 | A | * | 12/1987 | Smith | 180/7.1 |
| 5,720,529 | A | * | 2/1998 | Barron | 301/5.23 |
| 7,980,336 | B2 | * | 7/2011 | Takenaka et al. | 180/7.1 |
| 8,162,092 | B2 | * | 4/2012 | Takenaka et al. | 180/222 |
| 2003/0075366 | A1 | * | 4/2003 | Sabatie | 180/7.1 |
| 2010/0096905 | A1 | * | 4/2010 | Takenaka et al. | 301/5.23 |
| 2010/0139996 | A1 | * | 6/2010 | Takenaka et al. | 180/20 |
| 2011/0067936 | A1 | * | 3/2011 | Takenaka et al. | 180/21 |
| 2011/0067937 | A1 | * | 3/2011 | Gomi et al. | 180/21 |
| 2011/0067938 | A1 | * | 3/2011 | Gomi et al. | 180/21 |
| 2011/0067939 | A1 | * | 3/2011 | Takenaka | 180/21 |
| 2011/0067943 | A1 | * | 3/2011 | Waita et al. | 180/311 |
| 2011/0068738 | A1 | * | 3/2011 | Gomi et al. | 320/108 |
| 2011/0070997 | A1 | * | 3/2011 | Gomi et al. | 476/66 |
| 2011/0070998 | A1 | * | 3/2011 | Takenaka et al. | 476/68 |
| 2011/0209932 | A1 | * | 9/2011 | Takenaka et al. | 180/15 |
| 2011/0220427 | A1 | * | 9/2011 | Chen | 180/21 |
| 2012/0061156 | A1 | * | 3/2012 | Takenaka et al. | 180/21 |

FOREIGN PATENT DOCUMENTS

WO   2008-132779 A1   11/2008

* cited by examiner

*Primary Examiner* — Joseph Rocca
*Assistant Examiner* — Nicole Verley
(74) *Attorney, Agent, or Firm* — Carrier Blackman & Associates, P.C.; Joseph P. Carrier; William D. Blackman

(57) ABSTRACT

A frictional drive device comprising a pair of drive disks rotatably supported by a frame around a central axial line in a mutually opposing relationship, a pair of motors actuating the drive disks, a plurality of drive rollers arranged along an outer periphery of each drive disk at a regular interval and each having a rotational center line so as to be rotatable along a plane which is neither parallel nor perpendicular to the central axial line, and an annular main wheel comprising an annular member and a plurality of driven rollers supported along the annular member so as to be rotatable around a tangential line of the annular member, the main wheel engaging an object to the actuated, the central axial line of at least one of the drive disks is tilted in an outward direction with respect to a central axial line of the main wheel.

6 Claims, 5 Drawing Sheets

FRICTIONAL DRIVE DEVICE AND INVERTED PENDULUM TYPE VEHICLE USING THE SAME

TECHNICAL FIELD

The present invention relates to a frictional drive device and an inverted pendulum type vehicle using the same as a drive unit.

BACKGROUND OF THE INVENTION

Known is an inverted pendulum type vehicle or an omnidirectional vehicle comprising a pair of drive assemblies individually actuated by electric motors and a main wheel held between the drive assemblies and frictionally driven by the drive assemblies. See WO2004232779A1 (US20100096905A1) for instance. Each drive assembly comprises a drive disk coaxially opposing the drive disk of the other drive assembly and a plurality of drive rollers obliquely arranged along the circumference of the drive disk at a regular interval so as to be individually rotatable. The main wheel comprises a ring-shaped annular member rotatably supported by a frame around a central axial line thereof and a plurality of driven rollers arranged along the circumference of the annular member so as to be rotatable around the respective tangential lines. As the drive disks are turned by the electric motors, the driven rollers are frictionally driven by the drive rollers. When the drive rollers are turned around the tangential directions of the main wheel, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

In such an inverted pendulum type vehicle, it is essential that the driven rollers that are engaging the road surface in the lower part of the main wheel receive the drive force (or torque) by the drive rollers for the vehicle to be enabled to travel, but it is advantageous in terms of the drive efficiency that the driven rollers that are not engaging the road surface are not driven by the drive rollers.

BRIEF SUMMARY OF THE INVENTION

In view of such problems of the prior art and the recognition by the inventors, a primary object of the present invention is to provide a friction drive device of the aforementioned type having an improved drive efficiency.

A second object of the present invention is to provide a vehicle incorporated with a frictional drive device of the aforementioned type having an improved drive efficiency.

According to the present invention, such an object can be accomplished by providing a frictional drive device, comprising: a frame; a pair of drive disks rotatably supported by the frame around a central axial line in a mutually opposing relationship; a pair of actuators supported by the frame for individually rotatively actuating the drive disks; a plurality of drive rollers arranged along an outer periphery of each drive disk, typically at a regular interval, and each having a rotational center line so as to be rotatable along a plane which is neither parallel nor perpendicular to the central axial line; and an annular main wheel disposed approximately coaxially with respect to the central axial line and engaged by the drive rollers of the drive disks, the main wheel comprising an annular member and a plurality of driven rollers supported along the annular member so as to be rotatable around a tangential line of the annular member, the main wheel engaging an object to the actuated; wherein the central axial line of at least one of the drive disks is tilted in a prescribed direction with respect to a central axial line of the main wheel.

Thereby, only those driven rollers that are engaging the object to be actuated are engaged and driven by the drive rollers while those driven rollers that are not engaging the object to be actuated are spaced away from the drive rollers and are not driven by the driven rollers. It is preferable that this tilt angle may be varied or adjustable so that an optimum efficiency may be achieved at all times. To this end, the friction drive device may further comprise a tilt mechanism for selectively tilting at least one of the drive disks around a axial line extending in a direction perpendicular to a plane containing the central axial line of the main wheel and a point of the main wheel engaging the object to be actuated.

This friction drive device is able to actuate the object in any desired direction, but is unable to apply a torque to the object by itself. However, by configuring the tilt mechanism to tilt at least one of the drive disks around a axial line approximately passing a center of the main wheel and a point of the main wheel engaging the object to be actuated, the drive forces which the driven rollers (that are engaging the object to be actuated) apply to the object to be actuated may be varied from one driven roller to another. This creates a torque around an axial line approximately passing a center of the main wheel and a point of the main wheel engaging the object to be actuated.

The present invention also provides a vehicle incorporated with such a frictional device. In this case, the main wheel engages a road surface, instead of an object to be actuated, and the central axial line of at least one of the drive disks is tilted in a prescribed direction with respect to a central axial line of the main wheel. It can be said that the frictional drive device in this case applies an actuating force to the road surface, and the vehicle travels in a desired direction as a reaction to the actuating force.

For an efficient operation of the frictional drive device, the frictional drive device may further include a tilt mechanism for selectively tilting at least one of the drive disks around a axial line extending in a horizontal fore and aft direction.

This vehicle can travel in any desired direction, but is incapable of a yaw movement by itself However, by configuring the tilt mechanism to tilt at least one of the drive disks around a vertical axial line, the drive forces which the driven rollers (that are engaging the road surface) apply to the road surface may be varied from one driven roller to another. This creates a torque around a vertical axial line approximately passing through a center of the main wheel, and hence a yaw movement of the vehicle.

BRIEF DESCRIPTION OF THE DRAWINGS

Now the present invention is described in the following with reference to the appended drawings, in which.

DETAILED DESCRIPTION OF THE PREFERRED EMBODIMENTS

The vehicle according to the present invention is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one each of such pairs may be described in the following by denoting the component with a numeral without a suffix, instead of repeating the same description with respect to the other of the pair. These numerals are also used without the suffix in the following description to denote such components collectively.

Figure 1:
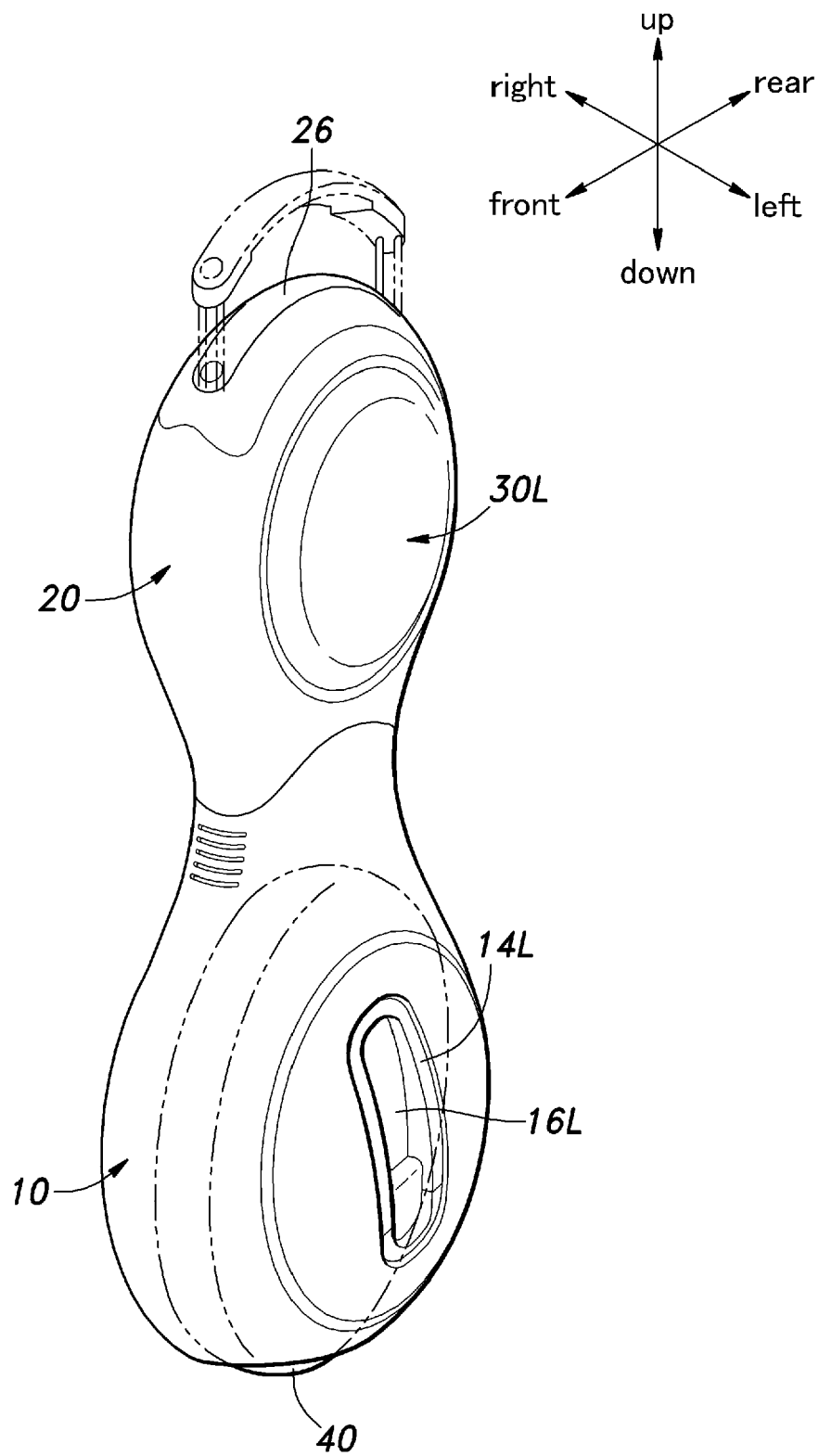
FIG. 1 is a perspective view of an inverted pendulum type vehicle embodying the present invention ready to be transported with the seat assembly and steps retracted.
Figure 2:
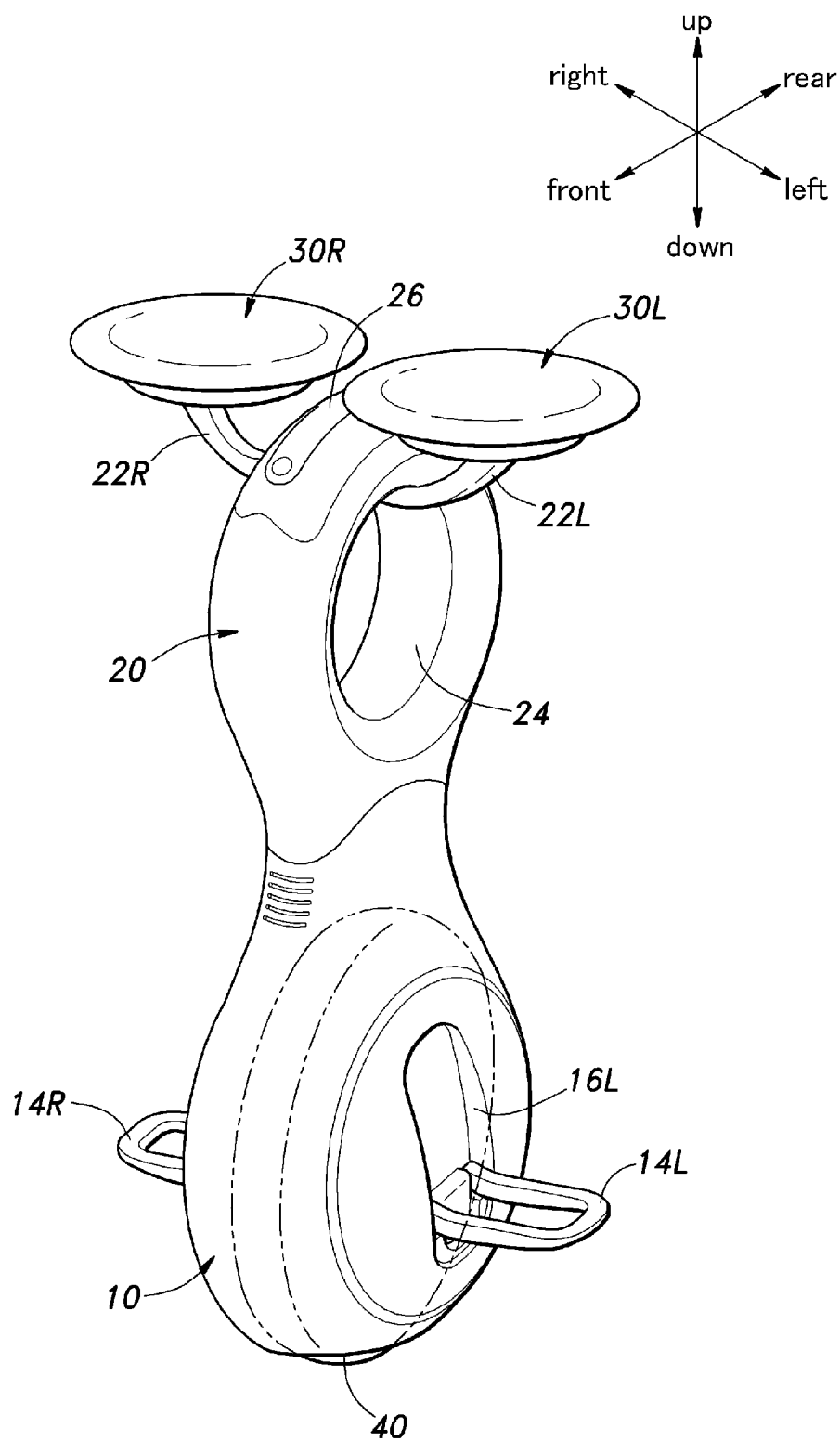
FIG. 2 is a view similar to FIG. 1 showing the vehicle ready to be operated with the seat assembly deployed for a vehicle occupant to sit thereon and steps deployed for the feet of the vehicle occupant to rest thereon.

Referring to FIGS. 1 and 2, the inverted pendulum type vehicle embodying the present invention comprises an upper frame 20 and a lower frame 10 which are connected to each other.

The lower frame 10 supports a drive unit 40 in the manner of a powered monocycle. The drive unit 40 is configured to maintain the vehicle (including the lower frame 10 and upper frame 20) in an upright posture under an inverted pendulum control using a gyro sensor and a load sensor, and allows the vehicle to travel in any two dimensional direction as will be described hereinafter.

A pair of steps 14 are provided on either side of the lower frame 10 and are each pivotally supported thereto by a pivot shaft extending in a fore and aft direction at a lower end thereof. Each step 14 is configured to be moveable between a deployed position where the step 14 extends laterally out of a step receiving recess 16 formed on the corresponding side of the lower frame 10 (as shown in FIG. 2) and a retracted position where the step 14 is tilted upward and received in the step receiving recess 16 (as shown in FIG. 1).

The upper frame 20 has an annular shape defining a central circular opening or a saddle storage space 24 extending laterally across the upper frame 20. A pair of saddle arms 22 are pivotally supported, at the base end thereof, by a support member secured to a part of the upper frame 20 defining the upper wall of the central opening, and extend laterally to either side of the upper frame 20 as shown in FIG. 2. The free end of each saddle arm 22 supports a saddle member 30. The saddle members 30 each consist of a disk shaped member extending approximately horizontally, and configured to jointly support the buttocks of a vehicle occupant.

Each saddle arm 22 is curved in such a manner that the convex side thereof faces downward in the deployed state illustrated in FIG. 2. When the saddle arms 22 are pivoted downward around the base ends thereof, the saddle arms 22 are received in the saddle storage space 24 and the saddle members 30 close the saddle storage space 24 from either side as shown in FIG. 1. In the retracted state illustrated in FIG. 1, the saddle members 30, in particular the cushion surfaces thereof, define a smooth outer profile of the upper frame 20 jointly with the outer surface of the upper frame 20.

The lower frame 10 includes a pair of side walls laterally spaced from each other, and the drive unit 40 is placed between the two side walls.

Figure 3:
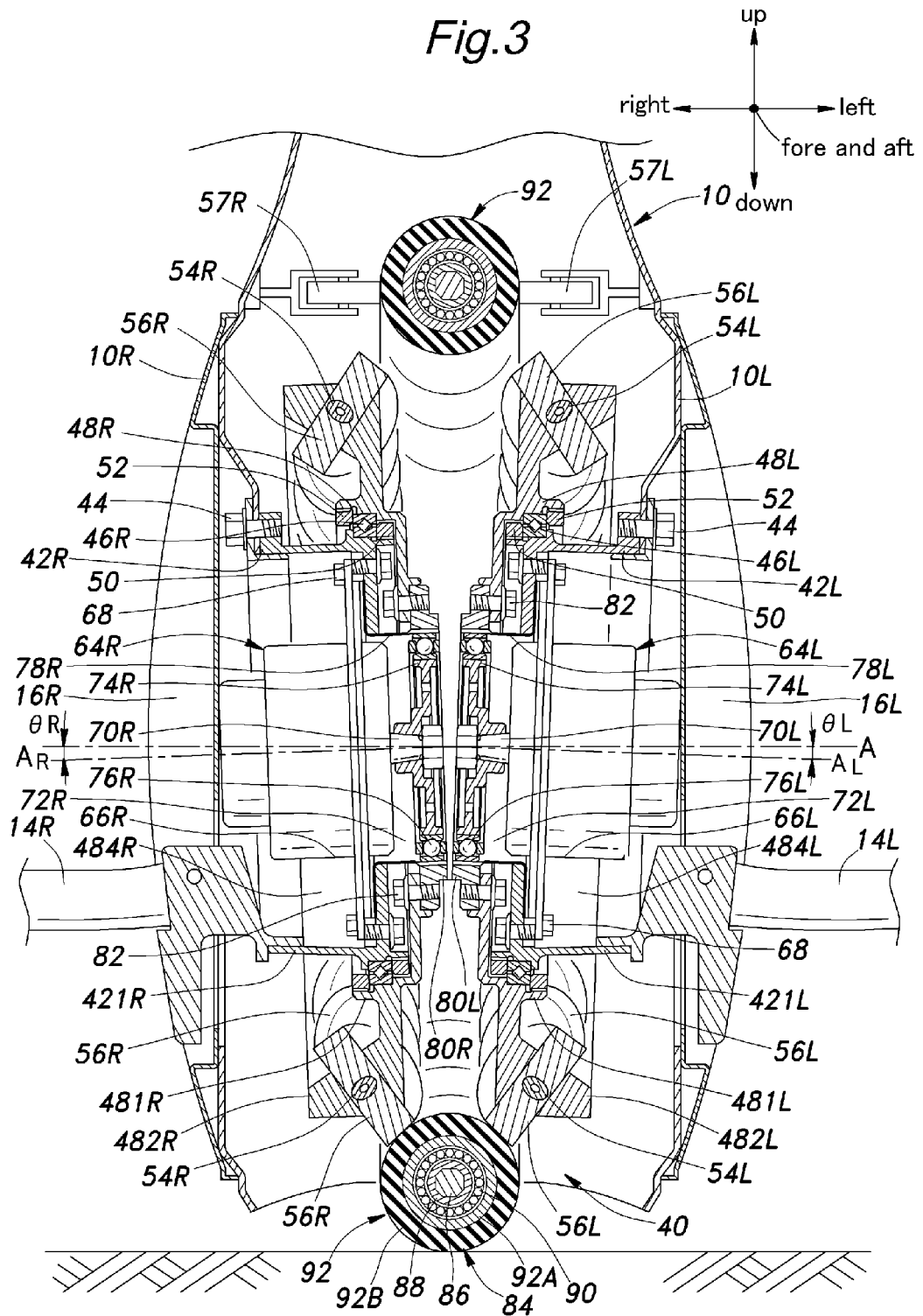
FIG. 3 is a sectional front view of a frictional drive device according to the present invention incorporated in the vehicle shown in FIGS. 1 and 2.
Figure 4:
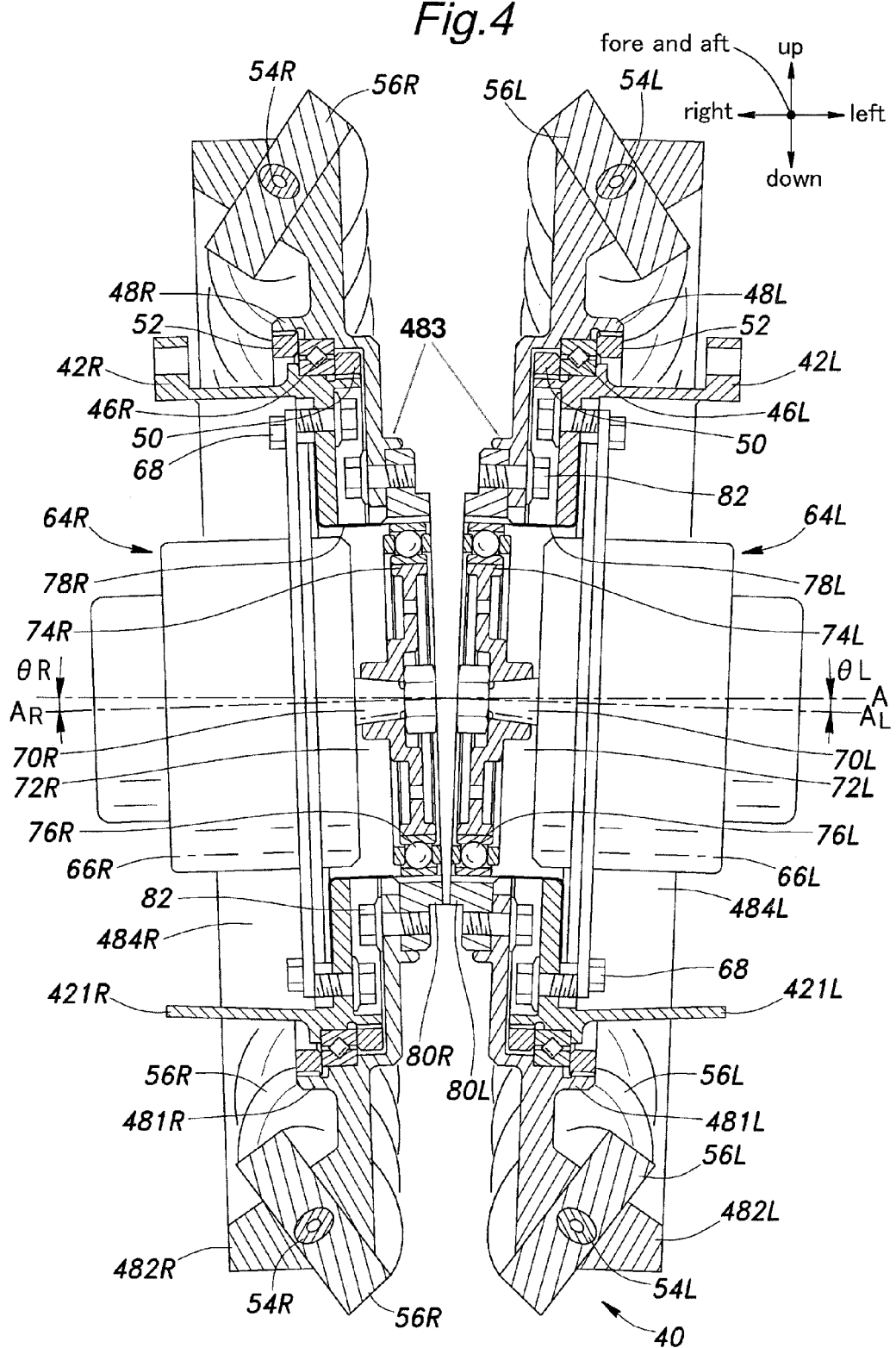
FIG. 4 is an enlarged sectional front view of the frictional drive device.

As shown in FIGS. 3 and 4, the drive unit 40 comprises a pair of symmetrically opposing drive assemblies. Each drive assembly comprises a laterally extending cylindrical mount member 42 having an outer axial end fixedly attached to the inner surface of the corresponding side wall by using threaded bolts 44. The central axial line $A_L$, $A_R$ of the mount member 42 is given with a slightly downward tilt angle $\theta_L$, $\theta_R$ in laterally outward direction with respect to a horizontal axial line A of the lower frame 10. In other words, the central axial line $A_L$, $A_R$ of the mount member 42 is tilted toward the object to be actuated (or the road surface) in an outward direction with respect to a central axial line of the main wheel.

The outer circumference of the mount member 42 rotatably supports an annular drive disk 48 via a crossed roller bearing 46 in a rotatable manner. The crossed roller bearing 46 is configured to support both a radial load and an axial (thrust) load, and is kept axially immobile with respect to the mount member 42 and drive disk 48 by a fastening ring 50 threaded onto a cylindrical portion 421 of the mount member 42 and a fastening ring 52 threaded into a central cylindrical portion 481 of the drive disk 48.

Thus, the drive disk 48 is supported so as to be rotatable around the central axial line $A_L$, $A_R$ of the mount member 42 which is tilted downward in a laterally outward direction by the angle $\theta_L$, $\theta_R$ with respect to the horizontal axial line A. This means that the central axial line of the drive disk 48 is tilted in a corresponding manner with respect to the central axial line of a main wheel 84 which will be described hereinafter.

Each drive disk 48 includes, in addition to the central cylindrical portion 481, a large annular portion 482 extending outwardly in the axial direction from the outer periphery of the central cylindrical portion 481. A plurality of drive rollers 56 are arranged along the periphery of the large annular portion 482 at a regular interval, and are rotatably supported thereby via respective roller shafts 54. Each drive roller 56 may be made of relatively rigid material such as metallic and plastic materials. The drive disk 48 has the function to support the drive rollers 56 at a prescribed orientation, and may have a disk, frusto-conical or any other shape.

The roller shafts 54L of the left drive disk 48L are disposed symmetric to the roller shafts 54R of the right drive disks 48R, and are in a skewed relationship to the corresponding central axial lines $A_L$, $A_R$, respectively. In particular, the drive rollers 56 are rotatably supported by the respective roller shafts 54 such that the planes of rotation of the drive rollers 56 are each disposed neither in parallel to nor perpendicular to the axial center line (center of rotation) $A_L$, $A_R$ of the drive disk 48. The positional relationship of the drive rollers 56 on the drive disk 48 may be similar to the gear teeth of a helical bevel gear of a prescribed cone angle. For more detailed description of the basic principle of the drive unit 40, see WO2008/139740A (US20100096905A1).

An electric motor 64 is coaxially disposed in a space 484 defined in the cylindrical portion 481 of each drive disk 48. Each electric motor 64 is provided with an outer housing 66 incorporated with stator coils (not shown in the drawings) and is fixedly secured to the mount member 42 by using threaded bolts, and a rotor shaft 70 extending inwardly or toward the other electric motor 64 in a coaxial relationship to the corresponding central axial line $A_L$, $A_R$.

To the free end of the rotor shaft 70 is connected a wave plug 74 of a wave gear device 72 of a per se known type. The wave plug 74 serves as the input member of the wave gear device 72, and is given with a high rigidity and an elliptic profile. The wave gear device 72 includes, in addition to the wave plug 74, a wave bearing 76 fitted onto the outer circumferential surface of the wave plug 74, a flexible external teeth member 78 consisting of a flanged cylindrical thin shell frictionally engaging the outer circumferential surface of the wave bearing 76 and having external teeth formed on the outer circumferential surface thereof, and an internal teeth member 80 having internal teeth on the inner circumferential surface thereof to be meshed with the external teeth of the external teeth member 78. The internal teeth member 80 serves as an output member of the wave gear device 72, and is fixedly secured to the drive disk 48 by using threaded bolts.

The wave gear device 72 transmits the rotational output of each electric motor 64 to the corresponding drive disk 48 at a high reduction ratio.

The wave plug 74, wave bearing 76 and internal teeth member 80 are received in the internal space of a cylindrical extension 483 extending coaxially inwardly from the drive disk 48. The electric motor 64 is received in the internal space of the central cylindrical portion 482 of the drive disk 48. These features contribute to the minimization of the axial dimension of the drive unit 40.

The main wheel 84 comprises an annular member 86 made of a ring having a polygonal cross section, a plurality of inner sleeves 88 fixedly fitted on the annular member 86 at a regular interval and a driven roller 92 rotatable supported by the outer circumferential surface of each sleeve 88 via a ball bearing 90. The driven rollers 92 are configured to engage a floor surface or road surface, and may each consist of a metal cylinder 92A fitted on the outer race of the ball bearing 90 and a rubber cylinder 92B integrally vulcanized onto the outer circumferential surface of the metal cylinder 92A.

The driven rollers 92 along with the associated inner sleeves 88 are arranged circumferentially along the entire circumference of the annular member 86, and the driven rollers 92 are each freely rotatable around the axial line thereof which is tangential to the corresponding position of the annular member 88.

The inner diameter of the main wheel 84 is smaller than the outer diameter of each drive assembly. The outer diameter of the main wheel 84 is larger than the outer diameter of the drive assemblies. The inner and outer diameters of the main wheel 84 and each drive assembly are defined by the corresponding envelopes of the drive rollers 56 and driven rollers 92, respectively. The main wheel 84 is thus interposed between the drive rollers 56 of the two drive assemblies.

The drive rollers 56L and 56R frictionally engage the rubber cylinders 92B of the driven rollers 92 at their respective circumferential surfaces so that the rotation (or torque) of the drive rollers 56L and 56R can be transmitted to the driven rollers 92.

The sizes and numbers of the driven rollers 92 and drive rollers 56L and 56R are selected in such a manner that at least one of the driven rollers 92 engages the floor or road surface and at least one each of the left and right drive rollers 56L and 56R engages the driven roller 92 engaging the floor surface. Thereby, the driven roller 92 engaging the floor surface may receive a force that causes the rotation of the main wheel 84 around the central axial line A and/or the rotation of the driven roller 92 around the central axial line thereof (tangential to the annular member 86).

In the illustrated embodiment, the mode of rotation of the main wheel 84 and rotation of the driven rollers 92 is determined by the modes of rotation of the two drive disks 56L and 56R. When the two drive disks 56L and 56R are rotated at a same speed in a same direction, the main wheel 84 rotates circumferentially or around the central axial line A while the driven rollers 92 do not rotate around the respective axial lines so that the vehicle travels either in the forward or rearward direction depending on the rotational direction of the drive disks 56L and 56R.

When the two drive disks 56L and 56R are rotated at a same speed in opposite directions, the main wheel 84 remains stationary while the driven rollers 92 rotate around the respective axial lines so that the vehicle travels sideways depending on the rotational directions of the drive disks 56L and 56R.

When the two drive disks 56L and 56R are rotated at mutually different speeds, the main wheel 84 is rotated around the central axial line A at a speed corresponding to the average of the rotational speeds of the two drive disks 56L and 56R, and the drive rollers 92 are rotated around their respective axial lines at a speed corresponding to the difference between the rotational speeds of the two drive disks 56L and 56R.

Therefore, by suitably selecting the rotational speeds of the two drive disks 56L and 56R, the vehicle is allowed to travel in any desired direction given as a composition of a fore-and-aft movement and a lateral movement.

The central axial lines $A_L$, $A_R$ of the two drive disks 56L and 56R are symmetrically tilted by the downward tilt angles $\theta_L$, $\theta_R$ in laterally outward direction with respect to the horizontal axial line A of the lower frame 10 so that only those drive rollers 56L and 56R located in the lowermost part of the drive disks 56L and 56R (where the two drive disks come closest to each other or to the main wheel 84) engage the driven rollers 92. In other words, the remaining drive rollers 56 other than those in the lowermost part of the drive disks 56 do not engage the driven rollers 92. As a result, only those driven rollers 92 engaging the road surface are actuated by the drive rollers 92, and the remaining driven rollers 92 are not uselessly actuated by the drive rollers 56. Therefore, the efficiency in driving the main wheel 84 can be improved.

In the illustrated embodiment, as shown in FIG. 3, a pair of freely rotatable guide rollers 57L and 57R having vertically extending pivot shafts are supported by the side walls of the lower frame on either side of the upper part of the main wheel 84, and guide the main wheel 84 in a vertical orientation at all times. The points at which the guide rollers 57L and 57R engage the main wheel 84 may be freely selected as long as the main wheel 84 may be prevented from tilting laterally, but preferably located slightly below the cross sectional center of the main wheel 84 because the main wheel 84 may be held in position (without dropping) even when the lower frame 10 is lifted. The guide rollers 57 may also be any other guide members such as caster rollers.

Figure 5:
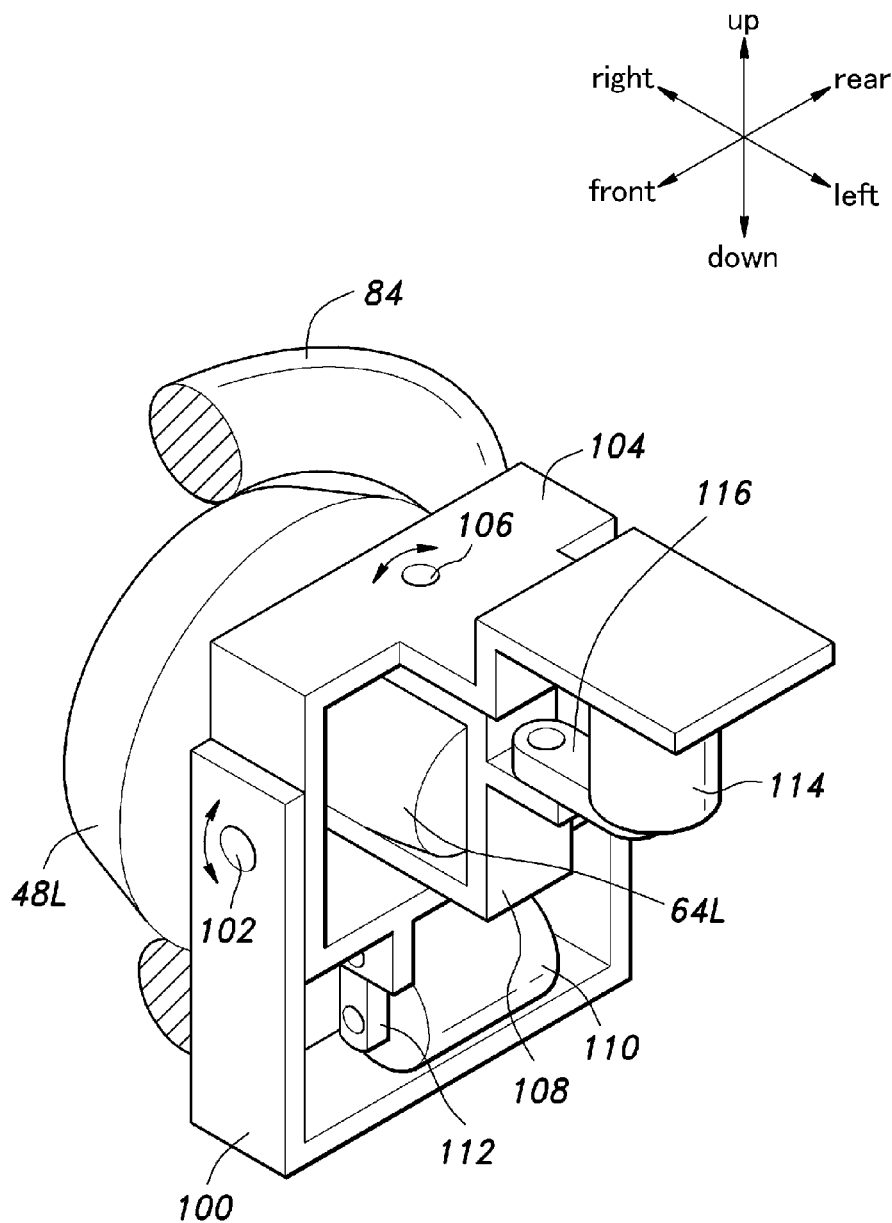
FIG. 5 is an enlarged perspective view of a tilting mechanism used in the frictional drive device.

The tilt angle of the drive disks 48 with respect to the horizontal axial line may be made adjustable by using a suitable mechanism. FIG. 5 shows a variable tilt mechanism for the left drive disk 48L. The variable tilt mechanism for the right drive disk 48R is a mirror image of that for the left drive disk 48L.

A fixed bracket 100 is configured to be fixedly attached to a suitable part of the lower frame 10, and a first tilt bracket 104 is mounted on the fixed bracket 100 so as to be tiltable around a horizontal pivot shaft 102 extending in a fore and aft direction. A second tilt bracket 108 is mounted on the first tilt bracket 104 so as to be tiltable around a vertical pivot shaft 106 extending in a vertical direction. The second tilt bracket 108 supports the drive assembly including the electric motor 64 and drive disk 48. In FIG. 5, the drive rollers 56 of the drive disk 48 are omitted from the illustration.

The fixed bracket 100 supports a first tilt motor 110 whose output end is connected to the first tilt bracket 104 via a lever 112 so that the tilt angle of the first tilt bracket 104 around the fore and aft horizontal pivot shaft 102 may be adjusted as desired. The first tilt bracket 104 supports a second tilt motor 114 whose output end is connected to the second tilt bracket 108 via a lever 116 so that the tilt angle of the second tilt bracket 108 around the vertical pivot shaft 106 may be adjusted as desired.

A control unit not shown in the drawings actuates the first tilt motor 110 so that the tilt angle of the first tilt bracket 104 around the fore and aft horizontal pivot shaft 102 or the tilt angle $\theta_L$, $\theta_R$ of the drive disk 48 relative to the horizontal axial line A can be adjusted according to the traveling direction, operating condition of the vehicle and/or wear in the drive rollers 92. Both the drive disks 48L and 48R may be configured to be adjusted either individually or jointly, or only one of the drive disks may be configured to be adjusted as desired.

By adjusting the tilt angle of the second tilt bracket 108 around the vertical pivot shaft 106 by using the second tilt motor 114, the contact pressures of the driver rollers 56 on the driven rollers 92 engaging the road surface may be made different from one driven roller 92 to another. This creates a yaw moment to the main wheel 85, and enables the vehicle to make a turn (a first steering action).

Also, the tilting of the second tilt bracket 108 around the vertical pivot shaft 106 by the second tilt motor 114 causes an angular movement of the main wheel 84 around a vertical axial line relative to the lower frame 10, and this also cause the vehicle to make to make a turn (second steering action).

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as the contents of any prior art references mentioned in this application are incorporated in this application by reference.

The invention claimed is:

1. A frictional drive device, comprising:
   a frame;
   a pair of drive disks rotatably supported by the frame around a central axial line in a mutually opposing relationship;
   a pair of actuators supported by the frame for individually rotatively actuating the drive disks;
   a plurality of drive rollers arranged along an outer periphery of each drive disk and each having a rotational center line so as to be rotatable along a plane which is neither parallel nor perpendicular to the central axial line; and
   an annular main wheel disposed approximately coaxially with respect to the central axial line and engaged by the drive rollers of the drive disks, the main wheel comprising an annular member and a plurality of driven rollers supported along the annular member so as to be rotatable around a tangential line of the annular member, and the main wheel engaging an object to be actuated;
   wherein the central axial line of at least one of the drive disks is tilted in a prescribed direction with respect to a central axial line of the main wheel.

2. The frictional drive device according to claim 1, further comprising a tilt mechanism for selectively tilting at least one of the drive disks around a axial line extending in a direction perpendicular to a plane containing the central axial line of the main wheel and a point of the main wheel engaging the object to be actuated.

3. The frictional drive device according to claim 2, wherein the tilt mechanism is additionally configured to tilt at least one of the drive disks around a axial line approximately passing a center of the main wheel and a point of the main wheel engaging the object to be actuated.

4. A vehicle incorporated with a frictional drive device, the frictional drive device comprising:
   a frame;
   a pair of drive disks rotatably supported by the frame around a central axial line in a mutually opposing relationship;
   a pair of actuators supported by the frame for individually rotatively actuating the drive disks;
   a plurality of drive rollers arranged along an outer periphery of each drive disk and each having a rotational center line so as to be rotatable along a plane which is neither parallel nor perpendicular to the central axial line; and
   an annular main wheel disposed approximately coaxially with respect to the central axial line and engaged by the drive rollers of the drive disks, the main wheel comprising an annular member and a plurality of driven rollers supported along the annular member so as to be rotatable around a tangential line of the annular member, and the main wheel engaging a road surface;
   wherein the central axial line of at least one of the drive disks is tilted in a prescribed direction with respect to a central axial line of the main wheel.

5. The vehicle according to claim 4, wherein the frictional drive device further comprises a tilt mechanism for selectively tilting at least one of the drive disks around a axial line extending in a horizontal fore and aft direction.

6. The frictional drive device according to claim 5, wherein the tilt mechanism is additionally configured to tilt at least one of the drive disks around a vertical axial line.

* * * * *